Inventor:
Alfred D. Tait
By Gillson, Mann & Cox
Attys.

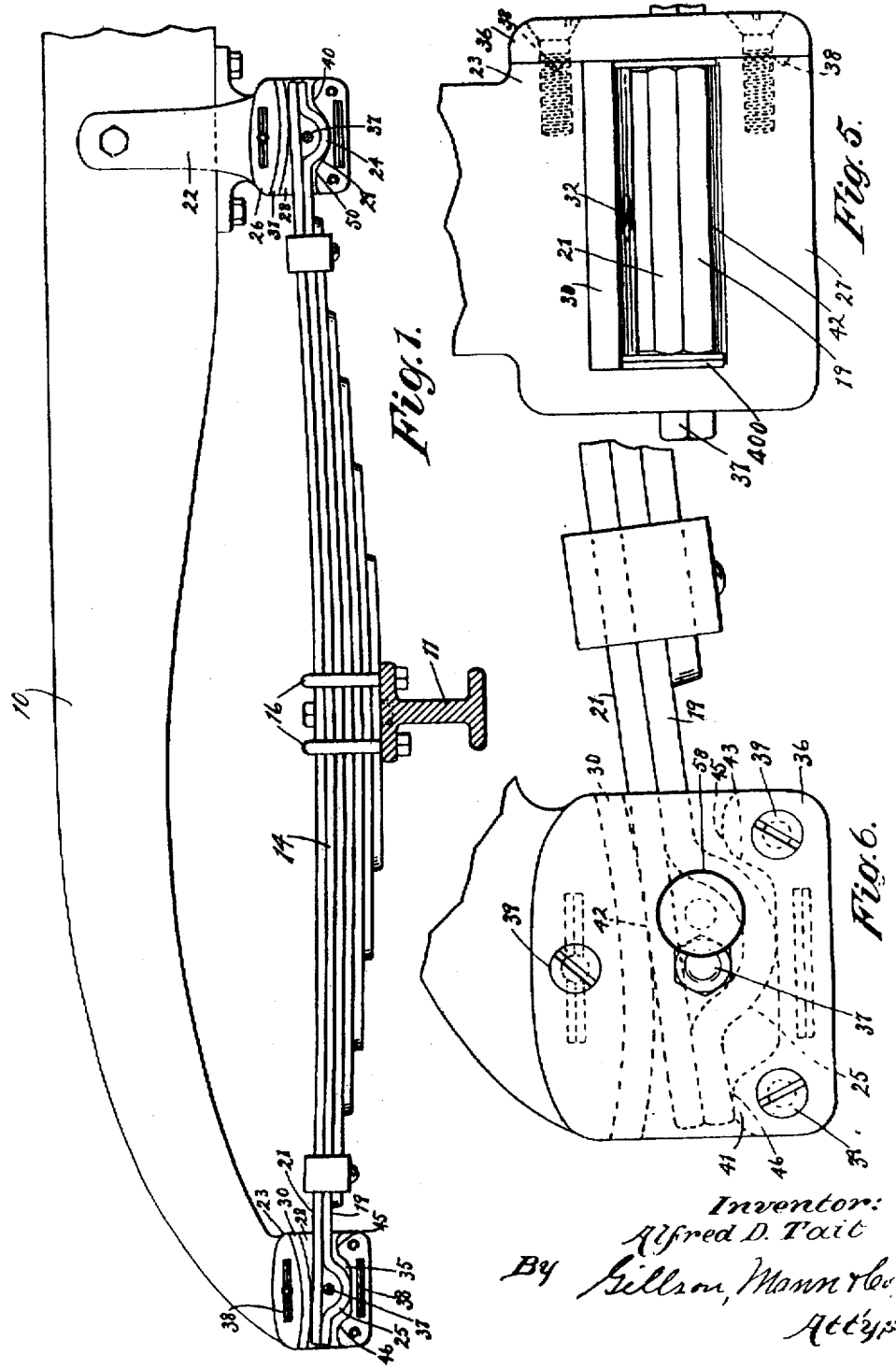

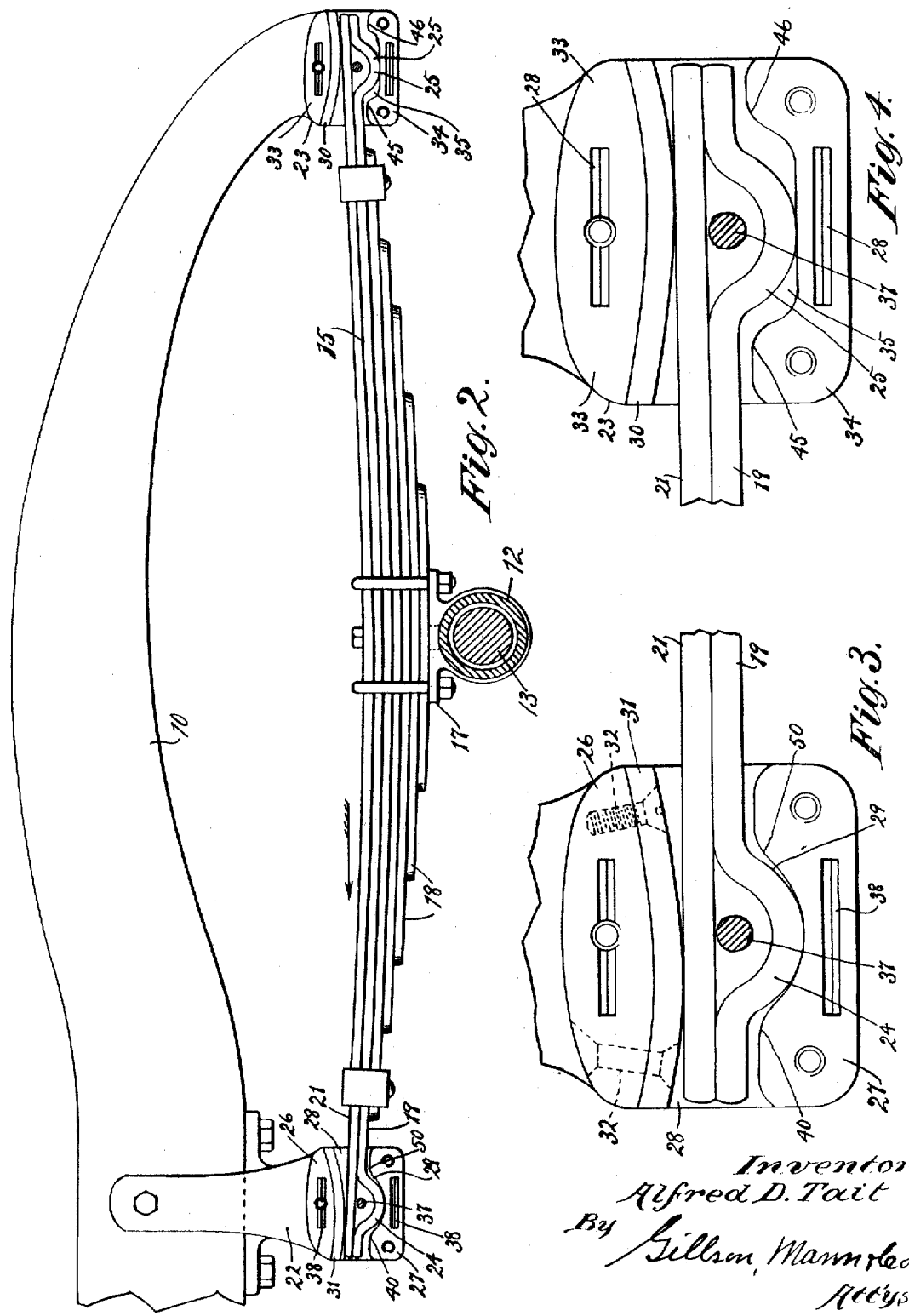

Patented May 25, 1926.

1,586,164

UNITED STATES PATENT OFFICE.

ALFRED D. TAIT, OF EVANSTON, ILLINOIS, ASSIGNOR OF THREE-FOURTHS TO WILLIAM S. WHITE, OF EVANSTON, ILLINOIS.

SPRING SUSPENSION.

Application filed October 16, 1924. Serial No. 743,959.

This invention relates to spring suspension, and more particularly to spring suspension for self propelled vehicles.

One of the objects of the invention is the provision of a new and improved spring suspension for supporting a vehicle frame, with a maximum amount of resiliency and with a minimum amount of vertical movement of the frame.

Another object of the invention is the provision of a new and improved frame supporting mechanism that constitutes a combined shock absorber, snubber and spring suspension.

A still further object of the invention is the provision of new and improved connecting means between the ends of the spring and the vehicle frame.

Other objects of the invention are the provision of new and improved spring suspension mechanism that is simple in construction, cheap to manufacture, easily assembled, efficient in operation, composed of a minimum number of parts, and that is not likely to become broken, permanently distorted or get out of order.

Other and further objects and advantages of the invention will appear from the following description taken in connection with the accompanying drawings, in which—

Fig. 1 is a side elevation of the front portion of a vehicle frame showing my invention in position thereon, with the front axle in section, parts removed and parts broken away;

Fig. 2 is a similar view of the rear portion of the vehicle frame;

Figs. 3 and 4 are enlarged views of the ends of the spring and the cooperating brackets;

Fig. 5 is an end elevation of the bracket with the end spring assembled therein;

Fig. 6 is a side elevation of one of the brackets showing the spring in deflected position;

Figure 9:
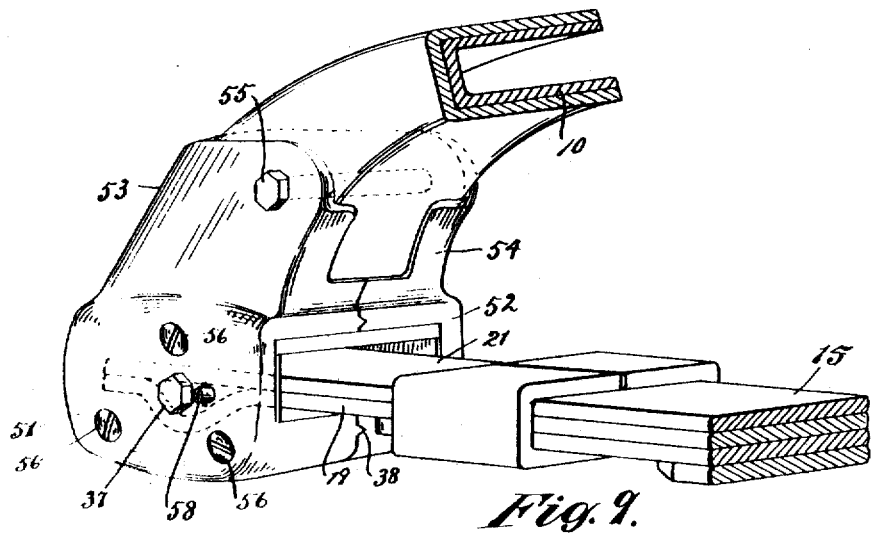
Fig. 9 is a perspective view of a modified form of the device.
Figure 7:
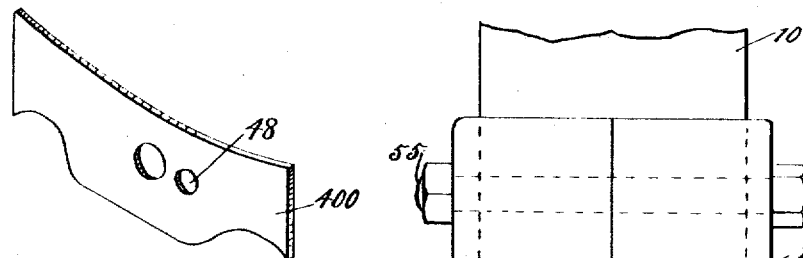
Fig. 7 is a perspective of one of the shims.
Figure 8:
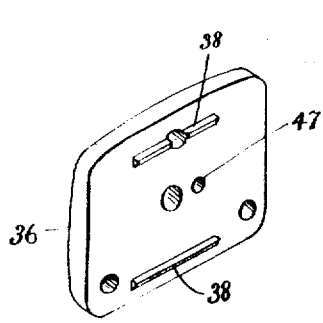
Fig. 8 is a perspective of one of the caps or plates for the bracket.

On the drawings the reference character 10 designates the chassis frame of an automobile, 11 the front axle, and 12 the rear axle including the housing in which the rear axle shaft 13 is rotatably mounted, all of which may be of the usual or any well known construction.

The chassis frame 10 is supported at its front and rear portion by leaf springs 14 and 15, respectively. The front spring 14 has its intermediate portion secured by any approved means, as the clips 16, to the front axle. The rear spring is likewise rigidly secured to the housing 12 as by means of the clips 17. It is understood that there is one of these springs at each end of each longitudinal member of the chassis frame, and since all four are very much alike, the description of one will suffice.

The spring comprises a plurality of leaves 18, see Fig. 2, increasing in length from the bottom up. One or more of the upper leaves are extended at each end thereof for engaging the spring brackets or hangers 22 and 23 rigidly secured to the chassis frame 10. In the form of the device selected to illustrate one embodiment of the invention two of the upper leaves 19 and 21 are of substantially the same length and are extended at each end for engaging said brackets. The springs may be and preferably are slightly curved upwardly at their ends when in position on the vehicle, as indicated in Figs. 1 and 2.

The lower leaf 19 is provided with downwardly projecting curved surfaces or transverse rounded offsets 24 and 25 at its front and rear ends respectively for engaging recesses in the hangers 22 and 23 as will presently appear. These surfaces may be and preferably are formed by bending the ends of the spring leaf 19 to the required curvature. These curved portions or offsets in the ends of the spring form, with the leaf 21, eyes that are adapted to receive a lubricant and through which the cap or plate retaining bolt may extend, as will presently appear.

It is common practice to provide shackles for mounting springs on motor vehicles. It is also common to rigidly secure one end of the spring to the chassis frame, but these arrangements are objectionable because they either permit undesirable movements of the frame, rusting and unnecessary friction of the shackle bolts, or result in permanent distortion or breaking of the spring caused by the sharp bending of the same due to its rigid connection to the frame. In order to overcome these and many other difficulties, I have provided a connection between the ends of the spring and the hangers that will permit relative movement between the same without resulting in objectionable movement of the chassis frame.

The spring hangers or brackets 22 and 23 are rigidly connected to the frame 10 in any suitable manner. As shown, the hanger or bracket 22 is removably mounted on the frame and the hanger 23 is integral therewith, but it is understood that they may be otherwise connected to the chassis frame.

Each hanger 22 is provided with a body portion having attaching flanges and laterally extending jaws 26 and 27 spaced apart to form the laterally opening slot 28 for receiving the spring leaves 19 and 21. The lower jaw 27 is provided with a downwardly extending curved recess 29 forming the shoulders 40 and 50. The recess is adapted to receive the offset 24 and permit the same to rock therein. The curved recess 29 is formed on a slightly greater radius than the offset 24, whereby the latter will be permitted to rock within said recess but will be prevented from sliding therein. By means of this arrangement the chassis frame is propelled forwardly by the connection at this point without the necessity of employing either radius rods or torque tubes.

The lower side of the jaw 26 is curved and it may be provided with a wear plate 31 which is secured thereto by suitable fastening means 32. The wear plate 31 may, if desired, be of the same material as the springs, but is preferably annealed instead of tempered in order to eliminate wear on the springs. The curvature of the under surface of the jaw 26 is such that the width of the slot is greater at its rear end than at its front end in order to accommodate the vibration of the body of the spring, and for a purpose that will presently appear.

The bracket or hanger 23 for the opposite end of the spring is also provided with upper and lower laterally extending jaws 33 and 34 similar to the jaws 26 and 27 of the bracket 22, except that the recess 35, forming the shoulders 45 and 46 in the lower jaw 34, is elongated for permitting a sliding as well as a rolling or rocking movement of the offset 25 of the spring. The lower curved surface of the jaw 33 is provided with a wear plate 30 similar in all respects to the plate 31.

The hangers are provided with cover or side plates 36, see Figs. 5 and 6, which retain the end of the spring in said slot. These plates are secured to the hangers or brackets 22 and 23 by bolts 37 which are adapted to extend through the eyes in the ends of the spring. The parts are so constructed that the bolts 37 never engage the surface of the eyes or springs during the operation of the machine. The plates 36 and engaging faces of the jaws of the brackets 22 and 23 are provided with interengaging or interlocking members 38 for positioning the plates. If desired additional securing means as the cap screws 39 may be employed to secure the plates to the brackets. In order to laterally adjust the spring and hold the same tightly within the brackets, shims 400 may be inserted in the slots at one or both sides of the spring, as occasion requires. These shims are provided with openings through which the bolts 37 engage for positioning the same within the slots. The shims prevent lateral movement of the spring thereby insuring vertical alinement of the leaves 19 and 21.

Suitable means are provided, aside from the inherent resilience of the spring, for gradually increasing the resistance to the downward flexing of the ends of the spring, whereby in the operation of the machine under normal conditions the vibration of the frame will be confined to narrow limits. Furthermore, the parts are so constructed and arranged that abnormal vibration of the frame in either direction beyond a predetermined amount will be positively prevented. In other words, the spring and its hangers or supporting brackets are so constructed and arranged that the same not only resiliently support the chassis frame, but also perform the function of a shock absorber and snubber.

In the construction shown, the weight of the frame is supported by the engagement of the plates 30 and 31 on the ends of the spring. Under normal load, with the machine at rest, the contact between the plates 30 and 31 and the spring is adjacent to the ends of the spring, but as the spring is deflected or its ends flexed downward by the weight on the frame or by the movements of the vehicle over an uneven roadbed, the springs roll inwardly along the curved surfaces 30 and 31 as indicated in Fig. 6, thus gradually shortening the effective length thereof and thereby adding an ever increasing resistance to the further downward movement of the frame.

Furthermore, since the distance between the ends of the spring will vary as the spring is flexed, the frictional resistance between the leaf 21 and the plate 30 and between the offset 25 and the jaw 34 as the ends of the spring slide along the jaw will also operate to dampen the vibrations of the spring.

When the spring has been flexed downwardly to the position shown in Fig. 6 the outer ends of the same will engage the shoulders 40 and 46 and the end portions of the spring will be clamped between said shoulders and the plates 30 and 31, which will prevent further pivotal movement between the spring and brackets, thereby resisting any further downward movement of the body of the spring. Furthermore, the clamping of the end of the spring in the bracket 23 will very greatly increase the frictional resistance to the further sliding of the offset 25 along the bracket, thus very materially resisting further downward movement of the frame. When the offset 25 engages the shoulder 43 the ends of the spring cannot further approach each other, and consequently further downward movement of the frame is prevented. In other words, the parts are so constructed that they operate as a shock absorber and snubber, and limit the downward movement of the frame to a predetermined maximum.

On the rebound, since the outer ends of the slots are more restricted than the inner ends, the ends of the spring will be gripped between the plates 30 and 31 and shoulders 45 and 50 respectively, soon after the frame has passed above its normal position, and the further upward the frame moves the more firmly the end of the spring is gripped and the greater the resistance to the sliding of the offset 25 along the bracket 23, and consequently the parts function to effectively check the rebound before the offset 25 comes in contact with the shoulder 45.

It will be noted that in both the depression and rebound of the spring the resistance offered to its flexure in either direction due to the gripping of the end of the spring and the consequent resistance to the sliding of the offset along the bracket 23 places a tensile instead of an additional flexing strain on the spring, and consequently the bracket engaging leaf or leaves of the spring may be much lighter and therefore more resilient than is possible with the conventional type of springs. In fact, in practice the leaves 19 and 21 are thinner than are usually employed and may be considered together as a main sectional leaf.

The arrangement of the brackets for the front springs may be and preferably is reversed from the arrangement of the brackets for the rear springs. In other words, the rear brackets 22 of the front spring are identical with the front bracket of the rear spring. These brackets 22 may be termed the power brackets since the power is delivered to the frame and front axle through the same.

The parts are so constructed that the power brackets are arranged at the intermediate portion of the frame. In other words, the brackets having the sliding connection with the spring are arranged at the front and rear of the vehicle.

The springs are assembled by moving the same laterally into the slots formed in the bracket and applying the caps or plates for retaining them in position therein. When the parts are assembled the front portions of the rear springs constitute what may be termed a resilient drive between the rear driving axle and the chassis frame.

If desired, an oil or grease passage 47 may be provided in the brackets for conducting the lubricant to the bearing between the brackets and the springs. Preferably the passage terminates opposite the eye of the spring whereby the same will constitute an oil or grease retainer for lubricating the parts. As shown, the caps or plates 36 are provided with apertures forming the passage 47 in which a grease cup may be inserted. The shims are also provided with apertures 48 which are adapted to aline with the passage 47 to permit the passage of the lubricant into the eye of the spring. These passages are shown as being arranged within the plates 36 but it is understood it is immaterial in what portion of the bracket they are arranged so long as they deliver the lubricant to the eye of the spring.

Figure 10:
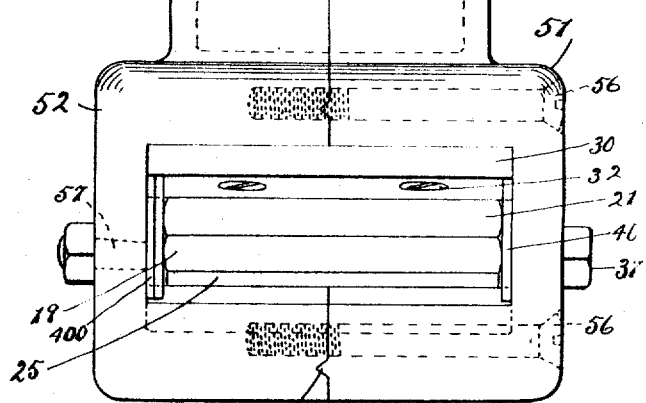
Fig. 10 is an end view thereof.

In the modified form of the device shown in Figs. 9 and 10 the bracket or spring hanger is divided into two sections, 51 and 52. The sections are provided with upwardly extending flanges 53 and 54 forming a channel on each section. The flanges of the two sections form a socket which is adapted to receive the end of the frame as shown in Figs. 9 and 10. The sections are held in position on the frame end by any suitable means, as the bolts 55. The sections may be held in assembled relation by bolts 56 which are adapted to extend through one section and be tapped into the other. One of the sections, as the section 52, may be provided with a passage 57 in which is secured a cup 58 for furnishing lubricant to the spring as in the construction shown in Figs. 1 to 6. The interior of the bracket and the connection of the spring thereto are substantially the same as in the brackets described above.

It is thought from the foregoing taken in connection with the accompanying drawings that the construction and operation of my device will be apparent to those skilled in the art. Various changes in size, shape, proportion and details of construction may be made without departing from the spirit and scope of the appended claims.

While I have shown and described my invention in connection with an automobile it is understood that such disclosure is by way of example only as the invention may be employed in other relations and on other types of vehicles.

I claim as my invention:—

1. In a vehicle spring suspension, a chassis frame, a pair of brackets rigidly connected to said frame, a pair of spring leaves rigidly connected together at their central portion, one of said leaves having each end provided with an offset, and the ends of the other leaf extending across said offsets to form eyes, and bolts extending through said brackets and eyes, the bolt fitting loosely in the eye at one end of said leaves to permit a pivotal sliding movement between the eye and the bracket.

2. In a spring suspension, a frame, a pair of brackets on said frame, a leaf spring having one end movably connected to one bracket and having an offset in the other end slidably connected with the other bracket.

3. In combination, a chassis frame a pair of axles, a plurality of springs for supporting said frame from said axles, each spring comprising a leaf, means for rigidly securing said leaf to one of said axles, a pair of spring hanger brackets rigidly mounted on said frame, means for movably connecting one end of said spring to one of said brackets, said means preventing a relative sliding movement between the spring and bracket, the other of said brackets being provided with a convex curved surface for engaging an end portion of said spring for permitting said spring to rock thereon, and cooperating means on said bracket and spring for limiting the movement of the end portion of said spring in either direction through said bracket.

4. In a spring suspension, a spring hanger bracket comprising a body portion provided with a fixed convex surface for forming a bearing for a spring and having a recess opposite said convex portion forming shoulders, said bracket being provided with an opening for receiving the end of a spring between said convex surface and said shoulders.

5. In a vehicle spring, in combination, a pair of master leaves, the lower leaf having a transverse rounded offset near its end, a box into which the ends of the leaves loosely project, the bottom of the box being recessed to loosely receive the offset, and the top of the box being rounded to form a sliding bearing for the upper leaf.

6. In combination, a chassis frame, a pair of spring brackets rigidly mounted on said frame, a leaf spring, means rigidly connected to said spring for movably connecting the same to said brackets, the connection between said spring and brackets being such that the ends of the spring are gripped in said brackets when said spring is flexed in either direction beyond a predetermined point.

7. In combination, a spring bracket and a spring having an eye in one end thereof movably mounted in said bracket, said bracket being provided with a passage terminating adjacent to said eye through which lubricant may be introduced into said eye.

8. In combination, a chassis frame, front and rear springs, inner and outer brackets for connecting said springs to said frame, the inner ends of said springs having a rockable connection with the inner brackets, and the outer ends of the springs having a sliding connection with said outer brackets whereby the forward portion of the rear spring and the rear portion of the front spring cooperate with the corresponding brackets for forming a driving connection for said frame.

9. In combination, a frame, hangers mounted on said frame, a spring having its ends connected to said brackets, and means on said brackets for causing frictional engagement between said spring and one of said brackets when said spring has been flexed beyond a predetermined amount.

10. In combination, a chassis frame, a pair of brackets mounted on said frame, a leaf spring having one of its ends secured to one of said brackets and having its other end slidably connected to the other bracket, and means on one of said brackets for gripping said spring for materially increasing the frictional resistance to the sliding movement between said spring and bracket when said spring is flexed beyond a predetermined amount.

11. In combination, a chassis frame, a pair of brackets mounted on said frame, a spring having one end secured to one of said brackets and having a sliding connection between its other end and the other of said brackets, means associated with one of said brackets for increasing the resistance to the sliding movement of said spring in said bracket and to limit the flexing of said spring.

12. A spring-attaching bracket comprising a body portion, a pair of jaws extending laterally in spaced relation to form a spring receiving slot, a curved wear plate secured to the under surface of the upper jaw, and a recess formed in the upper surface of the lower jaw, and a cap for closing one side of said slot.

13. A spring-attaching bracket comprising a body portion, a pair of jaws extending laterally in spaced relation to form a spring receiving slot, said slot being wider at one end than the other, a cap for closing one side of said slot, a bolt for securing said cap in position, and shims mounted on said bolt within said slot.

14. A spring-attaching bracket comprising a body portion split vertically into two sections, each having laterally extending jaws spaced apart to form a spring receiving slot, a channel attaching member extending upwardly from each section, and means for holding said sections together to form a closed slot for receiving a spring end and forming a socket for the reception of the end of a chassis frame bar.

15. In combination, a frame, a pair of brackets rigidly mounted on said frame, each of said brackets provided with laterally extending jaws, the upper of said jaws being curved, tempered wear plates on said upper jaws, said lower jaws each provided with a recess forming a shoulder at each end thereof, a leaf spring provided with a curved offset at each end for engaging in said recesses whereby when said spring is flexed its effective length is automatically changed and on further movement it will be clamped between said jaws and further flexing resisted, thereby materially increasing the frictional resistance to the sliding of said spring along the elongated slot, and whereby the loops will engage the inner shoulders to limit the flexing of the spring in either direction.

16. A bracket for a spring suspension comprising a body portion having laterally extending jaws spaced apart for the reception of the end of a leaf spring, the lower jaw being provided with a downwardly extending recess and said body portion being provided with attaching flanges.

17. In combination, a frame, a pair of brackets secured to said frame, one of said brackets being provided with a curved spring engaging surface, a leaf spring and means rigidly connected to said spring for connecting the ends of said spring to said brackets, whereby the same will engage said curved surface during the flexing of said spring.

In testimony whereof I affix my signature.

ALFRED D. TAIT.

brackets rigidly mounted on said frame, each of said brackets provided with laterally extending jaws, the upper of said jaws being curved, tempered wear plates on said upper jaws, said lower jaws each provided with a recess forming a shoulder at each end thereof, a leaf spring provided with a curved offset at each end for engaging in said recesses whereby when said spring is flexed its effective length is automatically changed and on further movement it will be clamped between said jaws and further flexing resisted, thereby materially increasing the frictional resistance to the sliding of said spring along the elongated slot, and whereby the loops will engage the inner shoulders to limit the flexing of the spring in either direction.

16. A bracket for a spring suspension comprising a body portion having laterally extending jaws spaced apart for the reception of the end of a leaf spring, the lower jaw being provided with a downwardly extending recess and said body portion being provided with attaching flanges.

17. In combination, a frame, a pair of brackets secured to said frame, one of said brackets being provided with a curved spring engaging surface, a leaf spring and means rigidly connected to said spring for connecting the ends of said spring to said brackets, whereby the same will engage said curved surface during the flexing of said spring.

In testimony whereof I affix my signature.

ALFRED D. TAIT.

Certificate of Correction.

It is hereby certified that in Letters Patent No. 1,586,164, granted May 25, 1926, upon the application of Alfred D. Tait, of Evanston, Illinois, for an improvement in "Spring Suspensions," an error appears in the printed specification requiring correction as follows: Page 5, line 31, claim 17, before the word "connecting" insert the word *rockably;* and that the said Letters Patent should be read with this correction therein that the same may conform to the record of the case in the Patent Office.

Signed and sealed this 20th day of July, A. D. 1926.

[SEAL.]

M. J. MOORE,
*Acting Commissioner of Patents.*

Certificate of Correction.

It is hereby certified that in Letters Patent No. 1,586,164, granted May 25, 1926, upon the application of Alfred D. Tait, of Evanston, Illinois, for an improvement in "Spring Suspensions," an error appears in the printed specification requiring correction as follows: Page 5, line 31, claim 17, before the word " connecting " insert the word *rockably;* and that the said Letters Patent should be read with this correction therein that the same may conform to the record of the case in the Patent Office.

Signed and sealed this 20th day of July, A. D. 1926.

[SEAL.]

M. J. MOORE,
*Acting Commissioner of Patents.*